United States Patent [19]

Martini-Vvedensky et al.

[11] Patent Number: 4,473,665

[45] Date of Patent: Sep. 25, 1984

[54] MICROCELLULAR CLOSED CELL FOAMS AND THEIR METHOD OF MANUFACTURE

[75] Inventors: Jane E. Martini-Vvedensky, Sudbury, Mass.; Nam P. Suh, Falls Church, Va.; Francis A. Waldman, London, England

[73] Assignee: Massachusetts Institute of Technology, Cambridge, Mass.

[21] Appl. No.: 403,831

[22] Filed: Jul. 30, 1982

[51] Int. Cl.³ .............................................. B29D 27/00
[52] U.S. Cl. ................................. 521/79; 264/45.3; 264/50; 264/176 R; 264/237; 264/DIG. 5; 264/DIG. 13; 264/DIG. 83; 521/146; 521/180; 521/182
[58] Field of Search ................... 264/50, 53, DIG. 13, 264/DIG. 5, 51, 45.5, 54, 45.3, DIG. 83, 237; 521/79, 74

[56] References Cited

U.S. PATENT DOCUMENTS

| | | | |
|---|---|---|---|
| 2,531,665 | 11/1950 | Booth | 264/50 |
| 2,590,156 | 3/1952 | Carpentier | 264/50 |
| 2,751,627 | 6/1956 | Lindemann | 264/50 |
| 2,783,894 | 3/1957 | Lovell et al. | 264/DIG. 13 |
| 3,121,760 | 2/1964 | Kline | 264/51 |
| 3,436,445 | 4/1969 | Brunner et al. | 264/50 |
| 3,491,032 | 1/1970 | Skochdopole et al. | 264/53 X |
| 3,544,384 | 12/1970 | Sundberg et al. | 264/53 X |
| 3,551,362 | 12/1970 | Decker | 264/53 X |
| 3,558,764 | 1/1971 | Isaacson et al. | 264/DIG. 13 |
| 3,647,329 | 3/1972 | Reifenhauser et al. | 264/53 X |
| 3,745,057 | 7/1973 | Loft et al. | 264/DIG. 13 |
| 3,796,779 | 3/1974 | Greenberg | 264/DIG. 5 |
| 3,806,291 | 4/1974 | Hendry | 264/50 X |
| 3,822,331 | 7/1974 | Cogliano | 264/51 |
| 3,871,897 | 3/1975 | Ealding | 264/DIG. 13 |
| 3,922,328 | 11/1975 | Johnson | 264/54 X |
| 3,962,387 | 6/1976 | Hendry | 264/50 |
| 3,988,404 | 10/1976 | Orimo et al. | 264/50 X |
| 4,096,218 | 6/1978 | Yasuike et al. | 264/53 X |
| 4,229,395 | 10/1980 | Nagumo et al. | 264/51 |
| 4,284,596 | 8/1981 | Inokuchi et al. | 264/53 X |
| 4,352,893 | 10/1982 | Johnson et al. | 264/45.5 X |
| 4,360,484 | 11/1982 | Rubens | 264/53 X |

FOREIGN PATENT DOCUMENTS 899389  6/1962  United Kingdom ................ 264/50

OTHER PUBLICATIONS

Martini, Jane Ellen, *The Production and Analysis of Microcellular Foam*, Master's Thesis–Mechanical Engineering, Massachusetts Institute of Technology, Aug. 1981, 153 pp.

Waldman, Francis Abbott, *The Processing of Microcellular Foam*, Master's Thesis–Mechanical Engineering, Massachusetts Institute of Technology, 1982, 139 pp.

Lacallade, Roger G., "Additives for Plastics–Chemical Blowing Agents for SF", in *Plastics Engineering*, Jun. 1976, pp. 40–42.

"The Encyclopedia of Patent Practice and Invention Management", Robert Calvert, Edt., New York, Reinhold, ©1964, pp. 42 and 46.

*Primary Examiner*—Philip E. Anderson
*Attorney, Agent, or Firm*—Arthur A. Smith, Jr.; Thomas J. Engellenner

[57] ABSTRACT

Microcellular foam materials having void fractions of about 5 to 30 percent and uniform void sizes on the order of 2 to 25 microns are produced by pre-saturating the material to be processed with a uniform concentration of a gas while controlling temperature and pressure to avoid cell nucleation. Processing is also done under pressure to avoid nucleation. After processing, pressure is released and cell nucleation occurs at or near the glass transition temperature of the material; it is then cooled quickly to preserve the microcellular structure.

25 Claims, 4 Drawing Figures

MICROCELLULAR CLOSED CELL FOAMS AND THEIR METHOD OF MANUFACTURE

TECHNICAL FIELD

This invention relates to polymer processing and, in particular, to the production of closed cell microcellular foams.

BACKGROUND OF THE INVENTION

Attention is directed to a master's thesis by one of the inventors herein, J. E. Martini, entitled "The Production and Analysis of Microcellular Foam" (M.I.T., August, 1981) and a master's thesis by another co-inventor herein, F. A. Waldman, entitled "The Processing of Microcellular Foam" (M.I.T., 1982), both of these theses are incorporated herein by reference.

Conventionally foams are produced by using either chemical or physical blowing agents. Chemical blowing agents are generally low molecular weight organic compounds which decompose at a critical temperature and release a gas (or gases), for example, nitrogen, carbon dioxide, or carbon monoxide. See, for example, R. Lacallade, *Plastics Engineering*, Vol. 32, June 1976, pp. 40-42 for a summary of various types of chemical blowing agents commercially available. Physical blowing agents are gases which are introduced as a component of the polymer charge or under pressure into the molten polymer during processing. See, for example, U.S. Pat. No. 3,796,779 issued to Greenberg on Mar. 12, 1974, where a method of injecting gas into a flowing stream of molten plastic is disclosed.

Most conventional techniques can only produce foams with large cells on the order of 100 microns or larger and with densities about 20-90 percent of the parent material. Fracturing of these large cell foam materials results in low strengths, typically much less than by merely the factor of reduced density.

There exists a need for stronger foam materials than presently available and, preferably, foam materials that are lighter so that less material is used in production without sacrificing the mechanical properties such as toughness. Such foams should have more uniformly-sized voids and generally smaller-sized voids, so that fractures are not initiated from these sites and these cells inhibit or terminate cracks without structural failure. Moreover, it would be advantageous to have foamed materials which exhibit higher toughness and/or strength while using less material.

Summary of the Invention

We have developed a new article of manufacture and a method of making such a article of manufacture which we call "microcellular foam". Our microcellular foam materials can be produced using pressurized extrusion or injection molding techniques. Foams having about 5-30 percent void fractions and void sizes on the order of 8 microns or less have been produced. By using out foams the same strength and improved stiffness can be achieved with less material. The fracture toughness increases nearly 400% as a result of enhanced craze initiation by the voids. The crack propagation resistance measured in impact tests improves by 200% largely due to blunting of the crack tip by the voids. The pressurized process can also be controlled to produce microcellular foams having a thin skin without voids to improve surface impact strength and to allow finishing operations.

In one aspect of our invention microcellular foams with about 2-25 micron-sized voids are produced by presaturating the material to be processed with a uniform concentration of gas. As the temperature is then increased, a cellular foam structure is formed. Cells nucleate; gas diffuses to the cells and the cells grow by matrix relaxation. In our invention the number of cell nucleation sites is very large because the plastic is supersaturated with gases once the plastic is removed from the high pressure environment and therefore, becomes thermodynamically unstable. When the temperature of this supersaturated plastic is raised, the plastic seeks a stable state by nucleating cells to which gases in the matrix diffuse. Since a large number of cells are nucleated over a short period of time, the supersaturated gas diffuses to all of these cells. Because the amount of gas available for each cell is inversely proportional to the number of cells, small cells result when a large number of cells are nucleated. Therefore, supersaturation of the plastic with gases permits one to control the number of cell nucleation centers.

Our invention differs from the state of the art in that we can control the uniformity and number of nucleation sites and produce extremely small cells. Additionally, we control the growth of the cells. Therefore, the material produced by this invention is tougher and exhibits large elongation.

Conventional chemical blowing agents release gas at a rate determined by temperature and reaction kinetics. Although others have attempted to increase the number of nucleation sites for chemical blowing agents by adding nucleation agents, such as calcium carbonate, talc or silica, the number of cells is limited and the cell distribution is less than uniform since they depend on the dispersion of nucleation agents. As a result the cell sizes obtained using chemical blowing agents are still course and non-uniform because the gas released goes into the limited number of cells available.

Similar problems are encountered when physical blowing agents are used in polymer processing. In addition, direct injection of gas into the melt in the barrel of an extruder is a very difficult process. The gas must be metered in such a way as to introduce enough gas in small enough quantities to allow the melt to reach an equilibrium concentration. Moreover, it is quite difficult to measure this concentration because it is not evident how much gas escapes the barrel. Although static mixers help to disperse gas pockets, these pockets may not all collapse during mixing. Even just a few pockets will create large voids in the foam. Since the strength of the resulting foam is of primary importance, any large voids will result in an unsatisfactory product.

Neither conventional physical blowing nor chemical blowing techniques permit one to reach the desired thermodynamic state for microcellular foams. Conventional methods cannot achieve the level of supersaturation or control over nucleation necessary for microcellular foams. The result is a non-homogeneous, poorly nucleated foam with large cells. We overcome this problem by presaturating the plastic with an initial concentration of gas in a pressurized environment which is a thermodynamically stable state and thus, easy to control. As the plastic is heated for processing, pressure is maintained to avoid premature nucleation.

In our invention, cell growth is carefully controlled by processing the plastic under pressure, maintaining the pressure while cooling to a "glass transition" temperature and then quickly cooling to maintain the microcellular structure. In conventional techniques, the processing temperatures and pressures are such that the cells grow in an uncontrolled fashion. Since the duration of cell growth in conventional methods is not controlled, voids are already too big before an article comes out of the mold or die. We have discovered cell growth can be controlled by processing at lower temperatures and higher pressures.

Our foam materials can find various applications. Impact polystyrenes (containing elastomer particles) can be processed by our techniques to make them lighter and improve their properties. Fibrous materials impregnated with resins can be made stronger and shrinkage-resistant by processing the resins, i.e. polyesters, to nucleate micro-voids during injection. Extruded thermoplastic fibers such as nylon and polyester can be made crack-resistant and less slick by introducing micro-voids prior to die extrusion and stretching.

Various materials can be processed by our technique. For examples, impact polystyrene, crystal grade polystyrene, polycarbonate, polyester, nylon and other thermoplastics with or without fillers can be processed. Carbon black can be incorporated into our polymers to further control void size.

Various gases can be used to supersaturate the material. For examples, air, noble gases (such as argon), nitrogen or carbon dioxide may be used. The pressure of the gas on the raw material should be high enough to provide uniform saturation, for example, the initial gas concentration may range from 1 cc(STP)/gram to 4 cc(STP)/gram, depending upon the material. For pellets of polystyrene a pressure of 350 psi was sufficient for saturation at room temperature.

The invention will next be described in connection with illustrated examples. However, it should be clear that various changes and modifications can be made to our processes and materials without departing from the spirit and scope of the claims.

DESCRIPTION OF THE PREFERRED EMBODIMENTS

The invention is first described in connection with the following batch-type sample: A sheet of high impact polystyrene was placed in an autoclave. Nitrogen gas was used to pressurize the autoclave to 350 psig for 48 hours to ensure complete saturation. The sheet was then removed from the autoclave and immersed in a stirred glycerin bath maintained at 105° C. by a temperature controller. After 30 seconds, the sheet was submerged in a cold water bath. The resulting sheet had a uniform microcellular structure with average cell size of 5 $\mu$m, as determined by scanning electron microscopy. The void fraction was determined by density change to be 25%.

The temperature of the bath was varied 5° C. increments by changing the set point on the temperature controller. The gas type was varied by using different cylinders of nitrogen, argon, and carbon dioxide. These gases were chosen for the wide range of diffusivities and solubilities. The initial concentration at saturation was varied by changing the set point on the pressure regulator from 150 psig to 900 psig. The duration of immersion in the bath was varied from 10 seconds to 3 minutes depending upon the particular temperature.

We found that as the temperature rose to a critical nucleation temperature, nucleation of cells began. Diffusion of gas from the surrounding matrix to these cells commenced, lowering the level of supersaturation in the depleted region. As the temperature continued to rise, the state of supersaturation increased because the gas become less soluble in the matrix. Nucleation continued as the temperature rose until the depleted regions interfere with one another. In the final growth regime, matrix relaxation, cells grew to a larger size due to the higher relaxation capability of the plastic.

The effects of varying initial concentration were most significant. The critical nucleation temperature was found to vary from 95° C. at very high concentrations to 105° C. for the low concentrations. A drop in the nucleation rate as the concentration decreased was evident. The number of cells nucleated, or cell density, increased by a factor of $10^6$ as the concentration was increased. At lower initial concentrations the nucleation rate was poor and large cell sizes were apparently due to the diffusion of the gas to a limited number of nucleated cells and additional relaxation growth. Preferably, to produce a foam morphology of 2-8 $\mu$m cells, the initial concentration should be greater than 2 cm$^3$ (STP)/gm. The upper limit on initial concentration appeared to be roughly 4 cm$^3$ (STP)/gm, as evidenced by non-homogeneous nucleation; apparently because at very high initial concentration of gas the number of cell nucleation sites reaches a limiting value.

Figure 1:
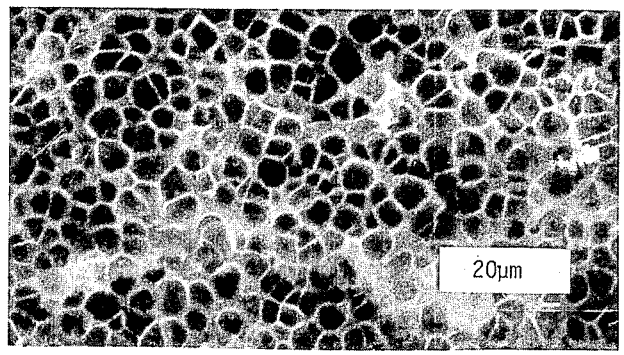
FIG. 1 is a microphotograph of the foam material of our invention.

The argon foams had larger cells apparently because of argon's high diffusivity. The rapid diffusion seemed to enhance cell growth after nucleation. At the same time, however, the nucleation time was shorter and fewer cells were nucleated. As a result the void fraction remained the same even though the cell size was larger for the argon foams. An increase in void fraction for the carbon dioxide foams apparently was a result of its higher solubility. The nitrogen and carbon dioxide foams exhibited similar diffusion characteristics but the void fraction for carbon dioxide foams increased while the cell size remained the same. Hence, the CO$_2$ had a higher cell density than those produced at the same concentration of nitrogen. This result suggests that carbon dioxide is a preferred foaming agent since it achieves better nucleation. A microphotograph of our foam material is shown in FIG. 1.

Figure 2:
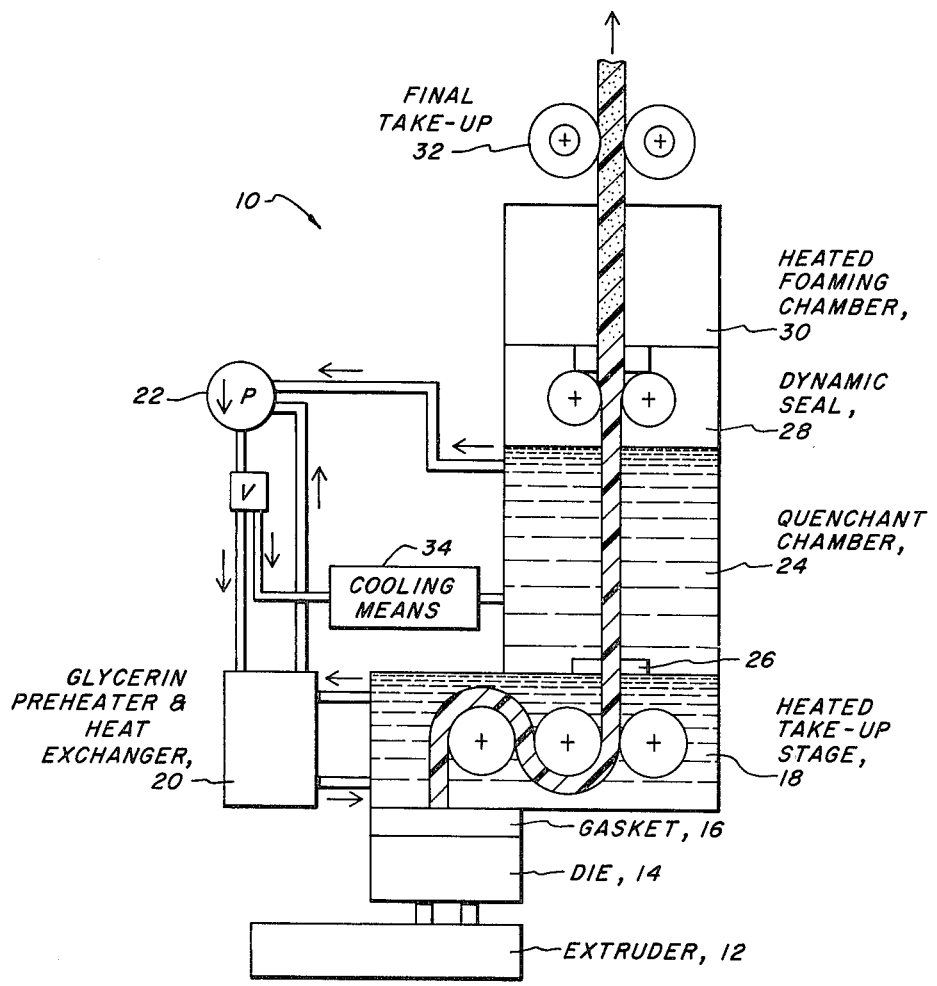
FIG. 2 is a schematic diagram of an extrusion process according to our invention.

In FIG. 2 an apparatus 10 for using our technique in extrusion processes is shown. Extruder 12 introduces molten polymer to Die 14. Plastic extruded through gasket 16 is taken up by heated take-up rollers 18. The plastic at this stage remains hot in a glycerin bath provided by glycerin preheater 20 and under pressure via pump 22. The plastic is then quenched under pressure in chamber 24, which is sealed by a liquid gasket 26 and dynamic seal 28. Finally, the plastic is foamed by heating to the critical nucleation temperature at a lower or ambient pressure in stage 30 and taken up by final rollers 32.

When our invention is used in an extrusion process, it is preferred to pre-pressurize the pellets at a temperature below the glass transition temperature until a sufficiently high, uniform concentration is achieved. The pellets are then transferred to the hopper of the extruder 12. In order to control the transition from the unstable to the stable thermodynamic state, the extruder 12 must be run at high pressure. A pressure chamber is added to the die so that the pressure in the die never drops to ambient and supersaturation never occurs prematurely in the die. As the plastic is cooled by the cold liquid in the quenchet chamber 24 and held under pressure, no nucleation occurs because the material is below the critical temperature at that pressure. The liquid is cooled by cooling means 34. The extrudate becomes supersaturated with gas in the liquid as the plastic cools down. Finally, the plastic is passed through a heated stage 30 which is about the critical foaming temperature, and at ambient pressure then cooled and removed.

Figure 3:
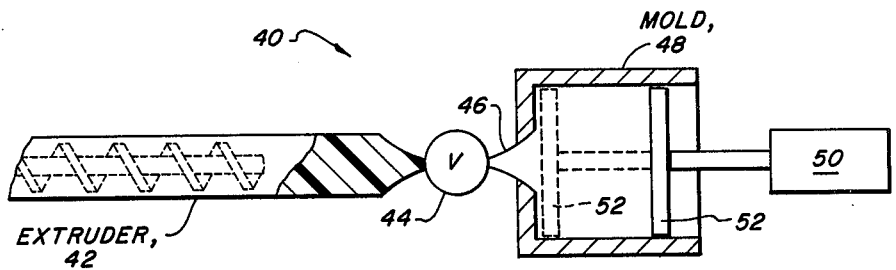
FIG. 3 is a schematic diagram of an injection molding process according to our invention.

A similar strategy can be applied to injection molding as shown in FIG. 3. The Figure illustrates a number of known elements such as extruder 42, valve 44, nozzle 46, mold 48 and a clamping hydraulic pressure means 50. The pressure in the mold 48 should not drop below the solubility pressure of the gas at melt temperatures for the given initial saturation. When the molded part temperature drops to the appropriate critical nucleation temperature the pressure is dropped and the part is allowed to foam. Again the key for formation of microcellular foam is the super-saturation of the plastic with gas to produce rapid nucleation of a large number of cells by inducing a transition from an unstable to a stable thermodynamic state. Conventionally, during the mold fill time the pressure at the end of the cavity remains at ambient pressure. To keep the melt from nucleating, a pressure similar to that in the chamber of the extruder 42 must be maintained in the cavity. This pressure can be supplied by a movable wall 52 under hydraulic pressure for simple part geometries. By our method during the shot, the melt 54 pushes against this movable wall. For complex geometries, the pressure may be supplied by a gas which is vented at the end of the mold cavity. When the temperature of the part reaches the nucleation temperature, for example 110° C., the mold 48 is either expanded or cracked to allow the pressure to drop to ambient. The part will then expand as the plastic 54 foams out to the final geometry. This strategy can be implemented on many existing structural foam injection molders by adding a movable wall 52 to the mold 48.

Figure 4:
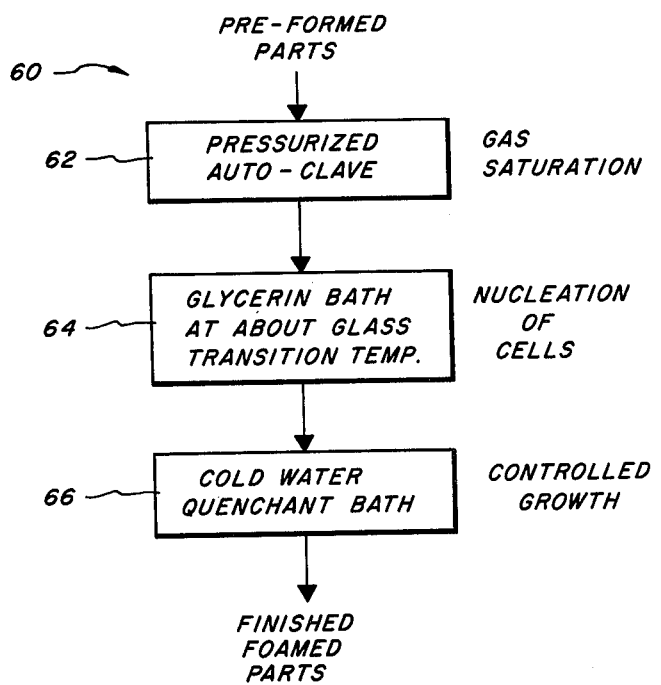
FIG. 4 is a schematic diagram of a batch foaming process according to our invention.

The batch processing technique 60 described earlier is shown in FIG. 4, wherein a pre-formed part is first saturated with gas in a pressurized autoclave 62 and then cells are allowed to nucleate in a glycerin bath 64 at about the glass transition temperature. The size of the voids is controlled by immersing the part in cold water quenchant bath 66 to produce a finished foamed part.

What we claim is:

1. A method for producing closed cell, microcellular-foamed structures in pre-formed polymeric materials, the method comprising:
   (a) saturating the material at an elevated pressure between about 1 cc (STP)/gram and about 4 cc (STP)/gram with a uniform concentration of a non-reactive gas;
   (b) heating the material to its glass transition temperature;
   (c) reducing the pressure to a state where the material is super-saturated with gas and a very large number of cells are nucleated; and
   (d) rapidly dropping the temperature of the material to prevent cell growth, whereby a foamed polymeric material having voids on the order of about 2 to 25 microns is produced.

2. A microcellular foam material formed by saturating a polymeric material at about its glass transition temperature with a uniform concentration of a gas, reducing the pressure, and then cooling the material, thereby controlling the nucleation of cells within the material, the material being characterized by uniformaly packed, closed cells ranging in size from about 2 microns to 25 microns and having a void fraction of about 5 to 30 percent.

3. The material of claim 2 wherein the material is further characterized by uniform closed cells less than 10 microns in diameter.

4. The material of claim 2 wherein the material is further characterized by having a void fraction of about 20 to 25 percent.

5. The material of claim 2 wherein the material further comprises at least one surface composed of a non-foamed thin skin.

6. A method of processing polymeric materials to produce closed cell, microcellular foams, the method comprising:
   (a) saturating the material at an elevated pressure and at a temperature below the glass transition temperature of the material with a uniform concentration of gas;
   (b) heating the material to a molten state to render it processable;
   (c) shaping the material at an elevated pressure sufficiently high to prevent cell nucleation within the material
   (d) reducing the temperature and pressure to a state where the material is super-saturated with gas and a very large number of cells are nucleated; and
   (e) rapidly dropping the temperature of the material after nucleation has occurred to prevent cell growth, whereby a foamed polymeric material having voids on the order of about 2 to to 25 microns is produced.

7. The method of claim 6 wherein the step of saturating the material at an elevated pressure further comprises saturating the material at an elevated pressure to produce an initial uniform concentration of gas in the material of about 1 cc (STP)/gram to 4 cc(STP)/gram.

8. The method of claim 6 wherein the step of saturating the material at an elevated pressure with a uniform concentration of gas further comprises saturating the material with argon gas.

9. The method of claim 6 wherein the step of saturating the material at an elevated pressure with a uniform concentration of gas further comprises saturating the material with a uniform concentration of nitrogen.

10. The method of claim 6 wherein the step of saturating the material at an elevated pressure with a uniform concentration of gas further comprises saturating the material with a uniform concentration of carbon dioxide.

11. The method of claim 6 wherein the step of reducing the temperature and pressure to a state where the material is supersaturated further comprises the steps of first reducing the temperature in a quenchant chamber and then reducing the pressure.

12. The method of claim 11 wherein the step of reducing the temperature in a quenchant chamber further comprises reducing the temperature in a quenchant chamber filled with glycerin.

13. The method of claim 6 wherein the step of processing the material further comprises processing the material by die extrusion.

14. The method of claim 6 wherein the step of processing the material further comprises processing the material by injection molding.

15. The material produced by the method of claim 1.

16. The material of claim 15 wherein the average void size is on the order of about 2 microns to 10 microns.

17. The material of claim 16 wherein the material is further characterized by having a average void size of about 25 microns or less.

18. The material of claim 15 wherein the material is further characterized as having a void fraction of about 5 to 30 percent.

19. The material of claim 15 wherein the material is polystyrene.

20. The material of claim 15 wherein the material is impact polystyrene.

21. The material of claim 15 wherein the material further comprises a polymeric material with fillers.

22. The material of claim 7 wherein the fillers further comprise carbon black.

23. The material of claim 15 wherein the material is a polyester.

24. The material of claim 15 wherein the material is nylon.

25. The material of claim 15 wherein the material is a polycarbonate.

* * * * *